Patented Aug. 1, 1933

1,920,540

UNITED STATES PATENT OFFICE 1,920,540

PROCESS FOR COLORING FRUITS AND VEGETABLES

John R. Winston, Robert Claude Wright and John F. Wootten, Washington, D. C., dedicated to the Government and the People of the United States of America No Drawing. Application March 21, 1931
Serial No. 524,410

4 Claims. (Cl. 99—11)

(Granted under the Act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public to take effect upon the granting of a patent to us.

This invention relates to the coloring of fruits and vegetables by means of ethylene gas. The commonly practiced method of coloring fruits in many sections of the country is to introduce ethylene gas in intermittent charges of concentrations varying from one part of gas to three thousand or four thousand parts of air in coloring rooms constructed for this purpose. These charges are repeated at from four to six hour intervals. Experimental evidence indicates that this high concentration of ethylene gas stimulates or promotes decay and further is probably responsible for a physiological disturbance known as rind scald on citrus fruits. The high concentration produced immediately after these charges of course gradually diminishes, and before the introduction of the next charge the amount of gas remaining in the room is usually so small as to be ineffective in continuing the coloring process. Previous to this present commonly used method of introducing intermittent charges of ethylene gas to color fruits, kerosene stove fumes were used. Under this method the fumes were introduced continuously rather than intermittently. This method is still used to some extent. Gasoline engine exhaust was at one time used rather extensively in the treatment of Satsuma oranges. These fumes were introduced continuously throughout the day, while at night the coloring rooms were opened to allow fresh air to enter to prevent a change in the flavor of the orange.

It has been determined that effective coloring of fruits can be obtained by the use of very low concentrations of ethylene gas delivered to the coloring rooms two or three times a day. In seeking a means to accomplish rapid coloring of fruits and vegetables and at the same time eliminate the objectionable features of the present method of administering ethylene gas as presented above, we have discovered that the introduction into coloring rooms containing fruits and vegetables to be colored of a continuous flow or supply of ethylene gas, in such small quantities that at any time the concentration in the coloring rooms would be much smaller than the average concentration obtained under the present usual method, accompanied by sufficient ventilation and air circulation throughout the room to prevent the accumulation or concentration of carbon dioxide derived from the respiration of the fruit, effectively and satisfactorily colors the fruits and vegetables and eliminates the objectionable features usually encountered as heretofore disclosed. We have discovered that the concentration of ethylene gas necessary to accomplish the desired purpose, as set forth above, should not exceed one part of ethylene gas to five thousand parts of air. The temperature of the coloring rooms should be maintained at a point most helpful to the coloring process. This may vary according to the fruits or vegetables to be colored. Temperatures ranging from 80° F. to 85° F. have been found to be satisfactory. Relative humidity in the coloring rooms should be such as to prevent shrinkage or shriveling of the fruits or vegetables to be treated, but should not be high enough to stimulate decay. A desirable range for humidity in the coloring room is found to be between 80 and 85 per cent. The fruits or vegetables should be exposed to the action of the ethylene gas until the desired coloring has been attained.

Having fully disclosed our discovery, we claim as our invention:

1. The process of coloring fruits and vegetables which comprises maintaining, by continuous flow of ethylene gas, in coloring chambers containing fruits and vegetables to be colored, a uniform concentration of ethylene gas sufficient to color the fruits and vegetables and incapable of causing deterioration.

2. The process of coloring fruits and vegetables which comprises maintaining, by continuous flow of ethylene gas, in coloring chambers containing fruits and vegetables to be colored, a uniform concentration of one part ethylene gas to five thousand parts of air and preventing the accumulation or concentration of carbon dioxide by adequately ventilating the coloring enclosure by adequately circulating the air and regulating the humidity to prevent shrinkage and decay.

3. The process of coloring fruits and vegetables which comprises maintaining, by continuous flow of ethylene gas, in coloring chambers containing fruits and vegetables to be colored, a uniform concentration of one part ethylene gas to five thousand parts of air.

4. The process of coloring fruits and vegetables which comprises maintaining, by continuous flow of ethylene gas, in coloring chambers containing fruits and vegetables to be colored, a uniform concentration of ethylene gas sufficient to color the fruits and vegetables and incapable of causing deterioration, and preventing the accumulation or concentration of carbon dioxide by adequately ventilating the coloring enclosure by adequately circulating the air and regulating the humidity to prevent shrinkage and decay.

JOHN R. WINSTON.
JOHN F. WOOTTEN.
ROBERT CLAUDE WRIGHT.